United States Patent
Yanagisawa

(10) Patent No.: US 9,417,393 B2
(45) Date of Patent: Aug. 16, 2016

(54) OPTICAL WAVEGUIDE DEVICE AND METHOD FOR MANUFACTURING THE SAME

(71) Applicant: SHINKO ELECTRIC INDUSTRIES CO., LTD., Nagano-shi, Nagano (JP)

(72) Inventor: Kenji Yanagisawa, Nagano (JP)

(73) Assignee: SHINKO ELECTRIC INDUSTRIES CO., LTD., Nagano-Shi (JP)

( * ) Notice: Subject to any disclaimer, the term of this patent is extended or adjusted under 35 U.S.C. 154(b) by 0 days.

(21) Appl. No.: 14/731,918

(22) Filed: Jun. 5, 2015

(65) Prior Publication Data

US 2015/0355409 A1 Dec. 10, 2015

(30) Foreign Application Priority Data

Jun. 9, 2014 (JP) .................. 2014-118334

(51) Int. Cl.
   *G02B 6/12* (2006.01)
   *G02B 6/32* (2006.01)

(52) U.S. Cl.
   CPC ............ *G02B 6/322* (2013.01); *G02B 6/12002* (2013.01); *G02B 6/12004* (2013.01); *G02B 2006/12104* (2013.01); *G02B 2006/12147* (2013.01)

(58) Field of Classification Search
   CPC ................ H01L 2924/00; H01L 2924/00014; G02B 6/43; G02B 6/4214; G02B 6/12
   USPC ............... 385/14, 15, 27, 30, 31, 33
   See application file for complete search history.

(56) References Cited

U.S. PATENT DOCUMENTS

| 8,639,067 B2* | 1/2014 | Matsuoka | G02B 6/12002 385/131 |
| 2015/0168646 A1* | 6/2015 | Arai | G02B 6/122 385/14 |
| 2015/0234125 A1* | 8/2015 | Sakai | G02B 6/32 385/14 |

FOREIGN PATENT DOCUMENTS

| JP | 2005-017684 | 1/2005 |
| JP | 2007-003817 | 1/2007 |
| JP | 2010-190994 | 9/2010 |

\* cited by examiner

*Primary Examiner* — Jennifer Doan
(74) *Attorney, Agent, or Firm* — Rankin, Hill & Clark LLP

(57) ABSTRACT

An optical waveguide device includes a wiring board, an optical waveguide, an optical path conversion mirror, a hole, and a lens component. The optical waveguide is disposed on the wiring board and includes first and second cladding layers and a core layer. The optical path conversion mirror is formed in the optical waveguide. The hole is formed in the first and second cladding layers and outside an optical waveguide formation region. The lens component is optically coupled to the optical path conversion mirror. The lens component includes a lens main body, a bump, and protrusion portions. The lens main body has a lens function. The bump is fixed to a structure including the wiring board and the optical waveguide, in the hole by a joining material. A diameter of a tip end of the bump of the lens component is smaller than a minimum diameter of the hole.

14 Claims, 18 Drawing Sheets

OPTICAL WAVEGUIDE DEVICE AND METHOD FOR MANUFACTURING THE SAME

CROSS-REFERENCE TO RELATED APPLICATION(S)

This application claims priority from Japanese Patent Application No. 2014-118334, filed on Jun. 9, 2014, the entire contents of which are herein incorporated by reference.

BACKGROUND

1. Technical Field

Exemplary embodiments of the invention relate to an optical waveguide device and its manufacturing method.

2. Related Art

Optical waveguide devices have been known in which an optical waveguide for guiding an optical signal is formed on a wiring board that handles electrical signals. Optical waveguide devices are optoelectronic composite boards and can transmit high-speed signals in the form of optical signals to compensate for the limit of electrical signal transmission speeds.

An optical path conversion mirror is disposed at an end portion of an optical waveguide, and an optical element is mounted on a wiring board so as to be optically coupled to the optical path conversion mirror in the optical waveguide. There has been an optical waveguide device in which a lens component is disposed in an optical path that is located over such an optical path conversion mirror.

SUMMARY

As described later with reference to comparative examples, in mounting of a lens component while the lens component is positioned with respect to an optical path conversion mirror of an optical waveguide, a method of fitting the lens component into a protrusion that protrudes from a surface of the optical waveguide cannot provide sufficient positioning accuracy.

On the other hand, in a technique of bonding a lens component to an optical waveguide with adhesive while positioning the lens component with respect to an optical path conversion mirror of the optical waveguide using image recognition, strict process management is required to prevent a part of the optical path conversion mirror from being coated with adhesive. Furthermore, a custom-made, dedicated mounter is required, which leads to cost increase.

One exemplary embodiment of the invention provides an optical waveguide device in which a lens component can be mounted with high positional accuracy at a low cost, and a method for manufacturing the optical waveguide device.

According to one aspect of the invention, an optical waveguide device includes a wiring board, an optical waveguide, an optical path conversion mirror, a hole, and a lens component. The optical waveguide is disposed on the wiring board. The optical waveguide includes a first cladding layer, a core layer, and a second cladding layer. The optical path conversion mirror is formed in the optical waveguide. The hole is formed in the first cladding layer and the second cladding layer and outside an optical waveguide formation region where the optical waveguide is formed. The lens component is optically coupled to the optical path conversion mirror. The lens component includes a lens main body, a bump and protrusion portions. The lens main body has a lens function. The bump is fixed to a structure including the wiring board and the optical waveguide, in the hole by a joining material. The protrusion portions protrude from the lens main body. A diameter of a tip end of the bump of the lens component is smaller than a minimum diameter of the hole.

In the above-configured optical waveguide device, the hole is formed in the first cladding layer and the second cladding layer and outside the optical waveguide formation region where the optical waveguide formed with the optical path conversion mirror is formed. The bump of the lens component is fixed to the structure including the wiring board and the optical waveguide in the hole by the joining material in a state where the lens component is optically coupled to the optical path conversion mirror.

In one exemplary embodiment, a metal bump of the lens component is fixed to a metal pad disposed in the hole, by solder. With this configuration, the lens component can be mounted by a common chip mounter. Thereby, cost reduction can be attained.

Furthermore, there is no concern that adhesive is applied to the optical path conversion mirror. Therefore, the process management is made easier, and the production efficiency can be enhanced.

DETAILED DESCRIPTION

Exemplary embodiments will be hereinafter described with reference to the accompanying drawings in detail.

Before description on the exemplary embodiments is given, comparative examples (related art) will be described.

Figure 1:
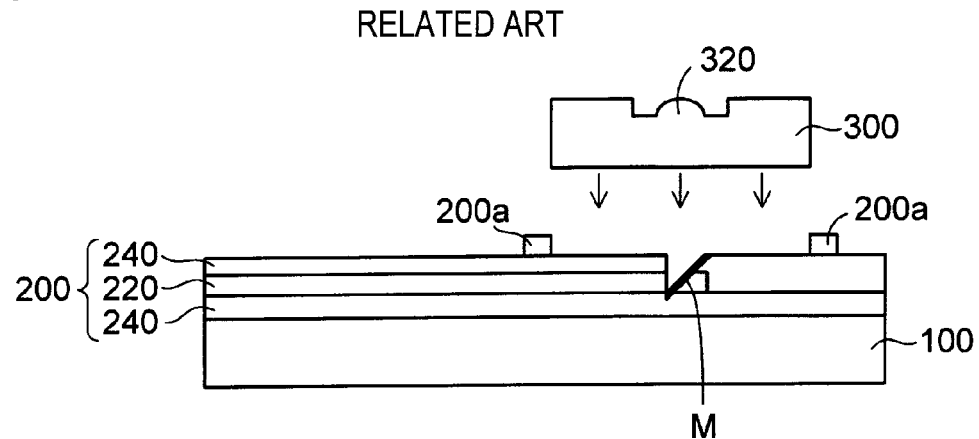
FIG. 1 is a sectional view illustrating a method for manufacturing an optical waveguide device of a first comparative example.

As shown in FIG. 1, in an optical waveguide device of a first comparative example, optical waveguides 200 are formed on a wiring board 100. In each optical waveguide 200, a core layer 220 is surrounded by cladding layers 240. An optical path conversion mirror M is formed at an end portion of each optical waveguide 200.

A lens component 300 is mounted on each optical waveguide 200 at a position where the lens component 300 corresponds to the optical path conversion mirrors M. The lens component 300 condenses and collimates light.

Methods for positioning each optical path conversion mirror M of the optical waveguide 200 and the associated lens 320 of the lens component 300 with respect to each other and arranging each optical path conversion mirror M and the associated lens 320 include the following method. That is, the lens component 300 is fitted into positioning protrusion portions 200a that are formed on the optical waveguides 200.

However, in this method, the accuracy of positioning between each optical path conversion mirror M and the associated lens 320 of the lens component 300 is so low that it is difficult to position them with respect to each other with positional accuracy that is higher than a design specification of ±2 µm.

The reason why the positional accuracy is low in the method of FIG. 1 is that the manufacturing errors of the lens component 300, manufacturing errors of the protrusion portions 200a formed on the optical waveguides 200, and manufacturing errors of the optical path conversion mirrors M all affect the positional accuracy.

Figure 2:
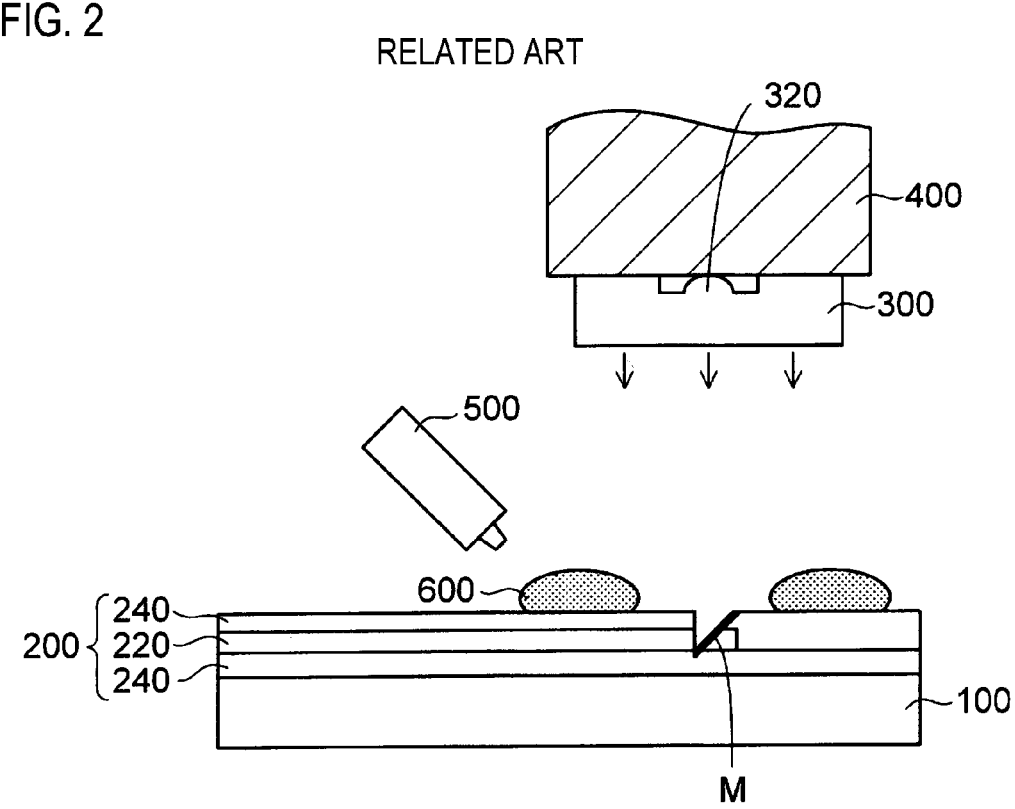
FIG. 2 is a sectional view illustrating a method for manufacturing an optical waveguide device of a second comparative example.

FIG. 2 shows another method. A lens component 300 is absorbed on an absorption head 400 of a mounter. The lens component 300 is positioned with respect to optical waveguides 200 by image-recognizing alignment marks (not shown) formed on the lens component 300 and the optical waveguides 200.

After the positioning, adhesive 600 is applied to the optical waveguides 200 from a dispenser 500. Then, the lens component 300 that is absorbed on the absorption head 400 is tentatively fixed to the optical waveguides 200 by the adhesive 600.

After the absorption head 400 is removed, the lens component 300 is fully fixed to the optical waveguides 200 by applying adhesive to outer circumferential portions of the lens component 300.

Whereas the method of FIG. 2 can solve the positional accuracy issue, the following issue remains.

In the method of FIG. 2, when the adhesive 600 is applied to the optical waveguides 200 after the positioning, upper surfaces of the optical waveguides 200 (including the optical path conversion mirrors M) are exposed. Therefore, strict process management is required to prevent the applied adhesive 600 from occupying parts of regions over the optical path conversion mirrors M. This is because the regions over the optical path conversion mirrors M of the respective optical waveguides 200 are parts of optical paths and hence need to be kept hollow.

This requires some countermeasure such as controlling an amount of applied adhesive 600 from the dispenser 500, resulting in a complicated process control. Or the optical waveguides 200 need to be formed with a dam layer(s) for damming up a flow of adhesive 600.

Furthermore, to execute a process of applying proper amounts of adhesive 600 while positioning the lens component 300 and the optical waveguides 200 with respect to each other, a custom-made, dedicated mounter would be required, which leads to cost increase.

Some of exemplary embodiments described below deal with the above issues.

First Exemplary Embodiment

FIGS. 3A to 9 illustrate a method for manufacturing an optical waveguide device according to a first exemplary embodiment. FIG. 10 shows the optical waveguide device according to the first exemplary embodiment. The method for manufacturing the optical waveguide device according to the first exemplary embodiment will be described below along with the structure of the optical waveguide device.

Figure 3A:
FIGS. 3A to 3D are a first set of views (sectional views and a plan view) illustrating a method for manufacturing an optical waveguide device according to a first exemplary embodiment, FIG. 3C being the sectional view taken along a line IIIC-IIIC shown in FIG. 3D.

In the method for manufacturing the optical waveguide device according to the first exemplary embodiment, at first, a wiring board 10 for handling electrical signals is prepared as shown in FIG. 3A. Metal pads MP to which a lens component (which will be described later) is to be fixed are formed on an upper surface of the wiring board 10.

It is noted that wiring layers for handling electrical signals are omitted in FIG. 3A. The metal pads MP and at least one of the wiring layers may be formed at the same height. The metal pads MP and the wiring layers are made of a wiring metal material such as copper. The metal pads MP are not electrically connected to the wiring layer.

For example, the wiring board 10 is configured in the following manner. That is, through conductors are formed through a core substrate made of an insulating material such as a glass epoxy resin. Wiring layers formed on both surfaces of the core substrate are electrically connected to the through conductors.

In addition, a multilayer wiring layer in which insulating layers and wiring layers are laminated alternately may be formed on the both surfaces of the core substrate. Alternatively, a coreless wiring board that has no core substrate may be used.

Figure 3B:
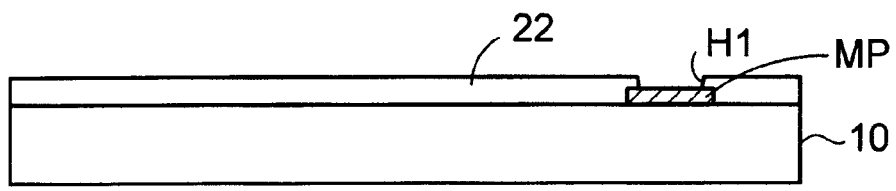

Next, a method for forming optical waveguides on the wiring board 10 will be described. At first, as shown in FIG. 3B, a photosensitive resin layer (not shown) for formation of a first cladding layer is formed on the wiring board 10. Then, the photosensitive resin layer is exposed and developed by photolithography.

Subsequently, the photosensitive resin layer is cured by heat treatment in a range of about 100° C. to about 140° C. Thereby, a first cladding layer 22 is formed in a desired area. The first cladding layer 22 is formed so as to have first opening portions H1 over the respective metal pads MP.

The first cladding layer 22 has a thickness in a range of 10 μm to 50 μm, for example, 35 μm. Where a non-patterned first cladding layer 22 is formed on the entire surface of the wiring board 10, a non-photosensitive resin may be used.

It is, for example, preferable that a UV-setting epoxy resin is used as the photosensitive resin. The photosensitive resin may be formed by either pasting a partially cured (B-stage) photosensitive resin sheet or applying a liquid photosensitive resin.

Figure 3C:
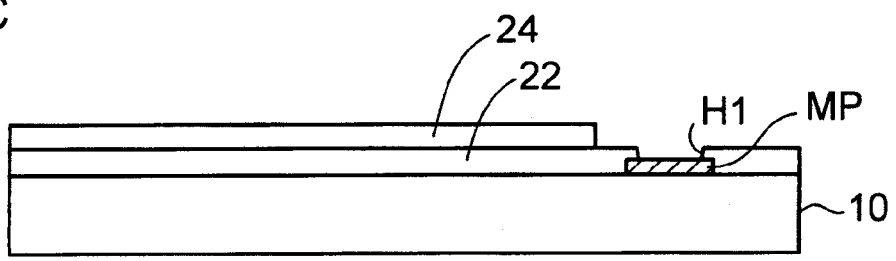
Figure 3D:
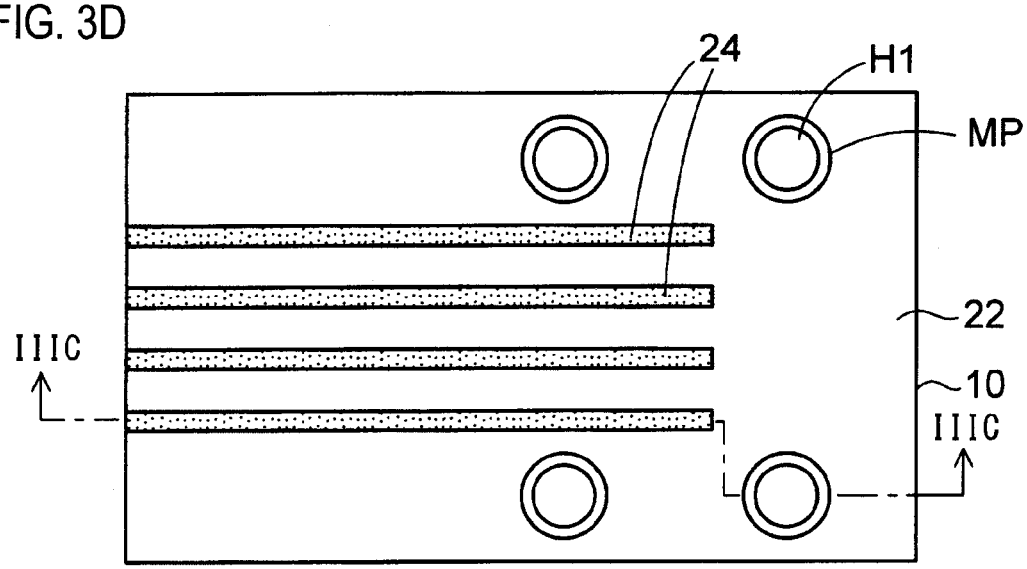

Then, as shown in FIGS. 3C and 3D, a photosensitive resin layer (not shown) for formation of core layers are formed on the first cladding layer 22. After being subjected to exposure and development by photolithography, the photosensitive resin layer is cured by heat treatment in a range of about 100° C. to about 140° C. Thereby, core layers 24 are formed on the first cladding layer 22.

FIG. 3C is a sectional view taken along a line IIIC-IIIC shown in FIG. 3D (which is a plan view). In FIG. 3D, each element is drawn as if to be transparent; this also applies to some of plan views that will follow.

In the example shown in FIG. 3D, four metal pads MP are formed outside an optical waveguide formation region where the plural (in this example, four) core layers 24 are (or are to be) provided. The four core layers 24 are arranged on the first cladding layer 22 so as to extend in right and left directions on the sheet of FIG. 3D, like band-shaped patterns. The four core layers 24 extend up to a region that is surrounded by the metal pads MP.

Each core layer 24 has a width in a range of 5 μm to 50 μm, for example, 25 μm and has a thickness in a range of 5 μm to 50 μm, for example, 25 μm.

Figure 4A:
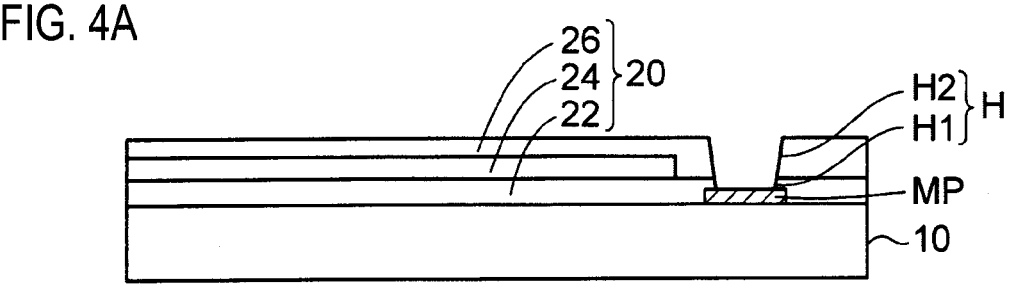
FIGS. 4A to 4D are a second set of views (sectional views and a plan view) illustrating the method for manufacturing the optical waveguide device according to the first exemplary embodiment, FIG. 4C being the sectional view taken along a line IVC-IVC shown in FIG. 4D.

Next, as shown in FIG. 4A, a second cladding layer 26 is patterned on the first cladding layer 22 by the same method as the first cladding layer 22 is formed. The second cladding layer 26 is formed so as to cover the core layers 24. The second cladding layer 26 has a thickness in a range of 5 μm to 30 μm, for example, 10 μm.

In this step, second opening portions H2 are formed through the second cladding layer 26 so as to communicate with the respective first opening portions H1 of the first cladding layer 22. Thereby, holes H are formed by the first opening portions H1 and the second holes H2. The holes H are formed in the first cladding layer 22 and the second cladding layer 26 and outside the optical waveguide formation region where the core layers 24 are provided. The holes H are located over the respective metal pads MP which are formed on the wiring board 10.

As a result, optical waveguides 20 including the first cladding layer 22, the core layers 24, and the second cladding layer 26 are formed on the wiring board 10. The refractive index of the core layers 24 is larger than those of the first cladding layer 22 and the second cladding layer 26.

In this manner, the four optical waveguides 20 are arranged in the optical waveguide formation region of the wiring board 10. Also, the first cladding layer 22 and the second cladding layer 26 extend from the optical waveguide formation region to a region outside the optical waveguide formation region.

In the above-described steps, the holes H are formed by photolithography. However, the first cladding layer 22 and the second cladding layer 26 may be formed of a non-photosensitive resin, and the holes H may be formed by laser processing.

Figure 4B:
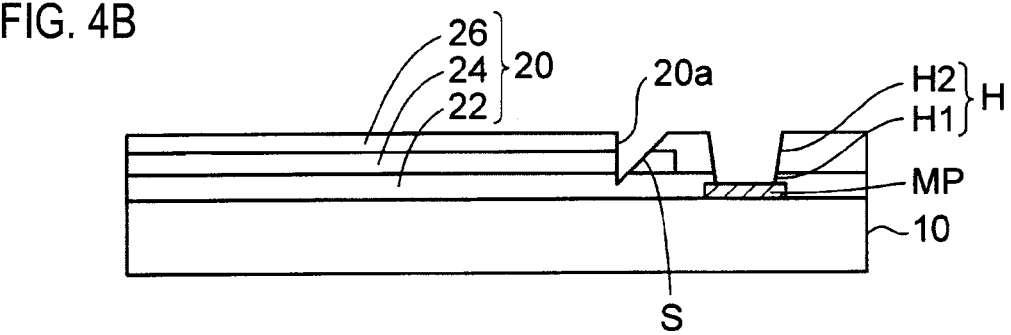

Subsequently, as shown in FIG. 4B, an end portion (which will become an optical path conversion portion) of each optical waveguide 20 is cut away in a thickness direction (in a vertical direction) by a rotary blade (not shown) of a cutting machine so that the core layers 24 are divided there. As a result, a groove 20a having a slant surface S is formed at the one end portion of each optical waveguide 20.

FIG. 4B shows only one end portion of each optical waveguide 20; actually, another groove 20a having a slant surface S is formed in the other end portion of each optical waveguide 20.

The slant surface S of each groove 20a is inclined so as to be form a predetermined angle (preferably 45°) with a direction in which the core layer 24 extends (i.e., light propagation direction).

Figure 4C:
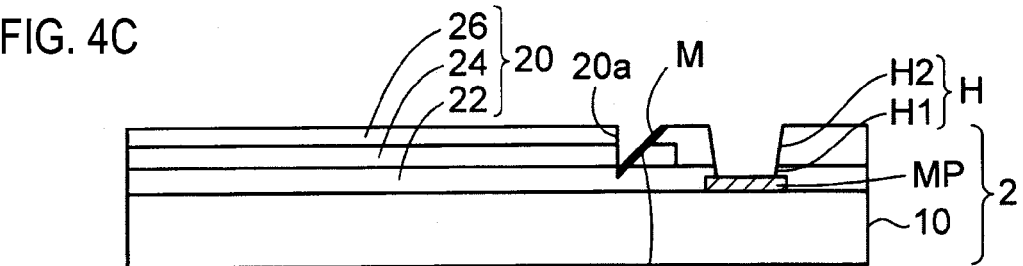

Then, as shown in FIG. 4C, light-reflective metal layers are formed on the slant surfaces S of the grooves 20a, respectively, by vapor deposition using a mask. Thereby, optical path conversion mirrors M are obtained. Examples of the light-reflective metal include gold and aluminum.

Figure 4D:
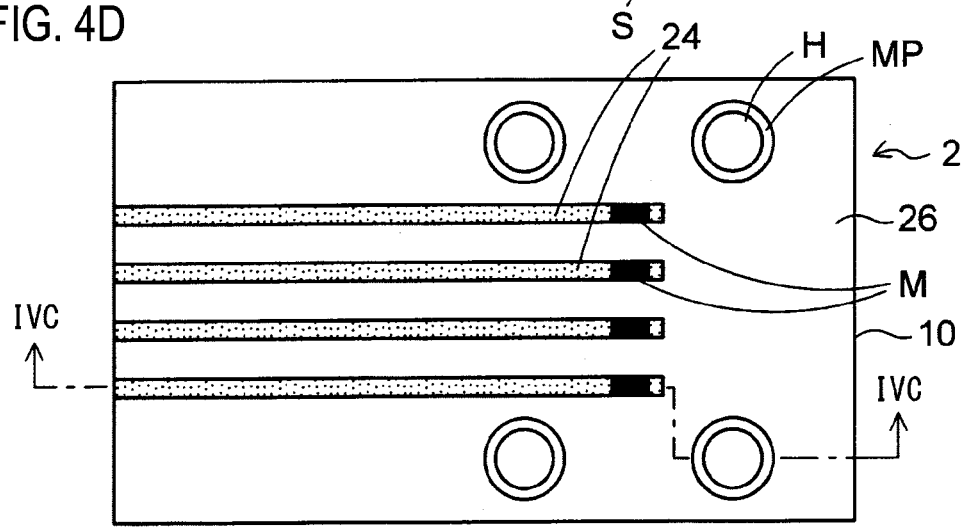

FIG. 4C is a sectional view taken along a line IVC-IVC shown in FIG. 4D (which is a plan view). As seen from FIG. 4D, the optical path conversion mirrors M are formed at the end portions of the core layers 24 of the optical waveguides 20, respectively. Thus, an optical waveguide equipped board 2 is obtained in which the optical waveguides 20 are formed on the wiring board 10. In the following description, the optical waveguide equipped board 2 may be simply referred to as a "board 2."

Figure 5A:
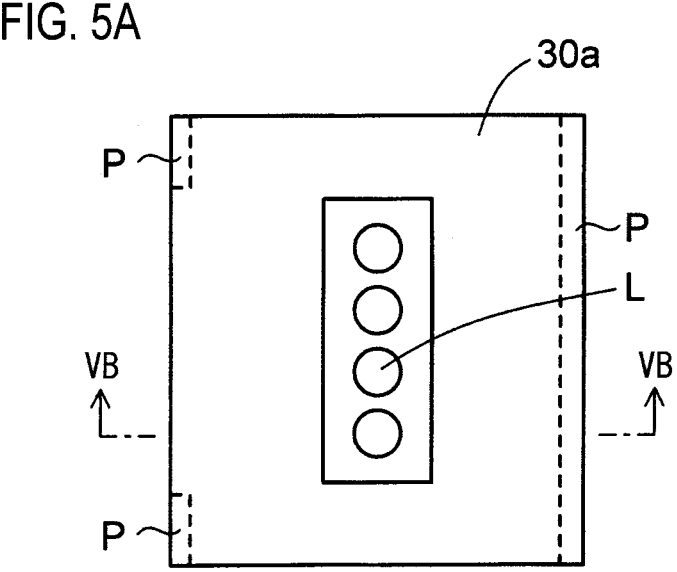
FIGS. 5A and 5B are a third set of views (a sectional view and a plan view) illustrating the method for manufacturing the optical waveguide device according to the first exemplary embodiment.
Figure 5B:
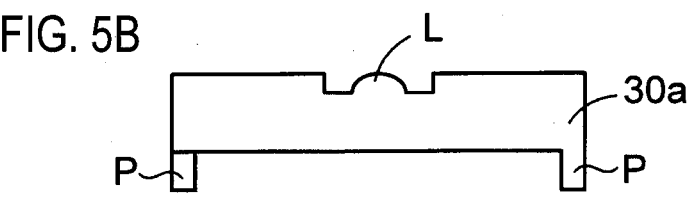

Next, a method for manufacturing a lens component to be mounted on the board 2 shown in FIGS. 4C and 4D will be described. At first, as shown in FIGS. 5A and 5B, a lens main body 30a made of glass is prepared. FIG. 5B is a sectional view taken along a line VB-VB shown in FIG. 5A (which is a plan view). Plural (in this example, four) convex lenses L are arranged on an upper surface of the lens main body 30a. That is, the lens main body 30a has a lens function.

The four convex lenses L of the lens main body 30a are arranged so as to correspond to the respective optical path conversion mirrors M of the board 2 shown in FIGS. 4C and 4D. A protrusion portion P protrudes downward from one end portion, in the right and left directions on the sheet of FIG. 4C, of the rectangular lens main body 30a. Furthermore, two protrusion portions P protrude downward from both sides, in the upper and lower directions on the sheet of FIG. 4C, of the other end portion of the lens main body 30a. When the lens component is mounted on the board 2, the height of the lens component (a position of the lens component in the vertical direction) as measured from the board 2 is determined by the height of the three protrusion portions P.

The lens main body 30a is formed by injection molding. In the injection molding, molten glass is injected into a die and solidified by cooling. Thereby, an integral mold is formed.

Figure 5C:
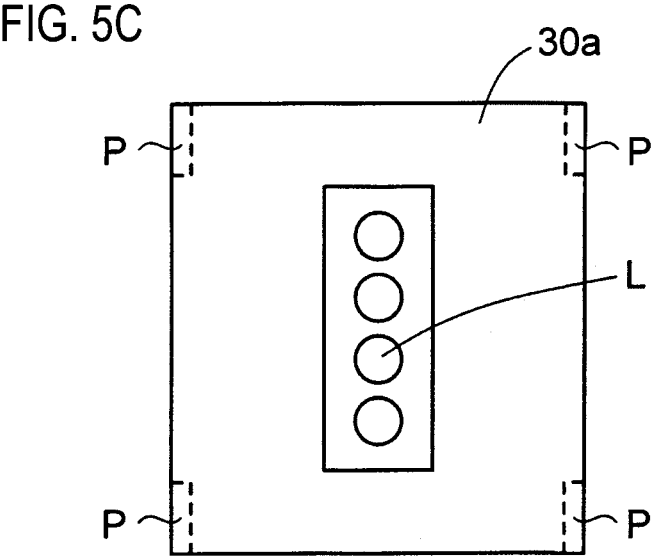
FIG. 5C is a plan view showing a modification example of a lens component.

In FIG. 5A, the protrusion portion P provided on the one end portion (right end portion on the sheet of the figure) of the lens main body 30a is an integrated protrusion portion extending entirely between end portions of the lens main body 30a in the upper and lower directions on the sheet of the figure. Alternatively, separate protrusion portions P may be provided on the one end portion of the lens main body 30a as shown in FIG. 5C.

Figure 6A:
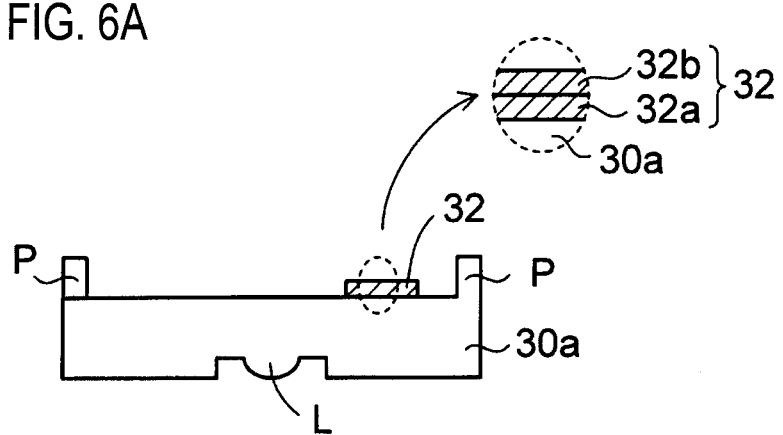
FIGS. 6A and 6B are a fourth set of views (sectional views) illustrating the method for manufacturing the optical waveguide device according to the first exemplary embodiment.

Next, as shown in FIG. 6A, gold (Au) layers 32a are formed on a rear surface of the lens main body 30a by vapor deposition using a mask. Also, copper (Cu) layers 32b are formed on the respective gold layers 32 by electroless plating. The gold layers 32a and the copper layers 32b constitute respective metal seats 32.

Figure 6B:
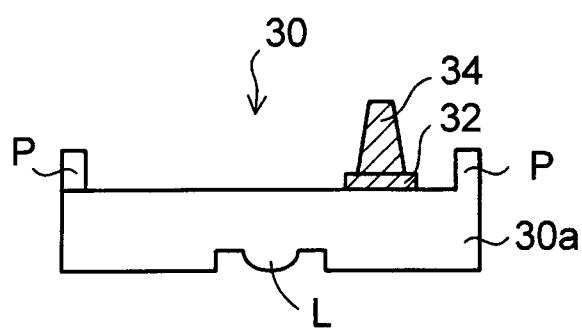

Subsequently, as shown in FIG. 6B, gold bumps 34 (which may be referred to as "gold studs) are formed on the respective metal seats 32 by a wire bonding method.

A diameter of a tip end of the gold bumps 34 is smaller than a minimum diameter of the holes H of the board 2 shown in FIGS. 4C and 4D. For example, a diameter of a base end of each gold bump 34 is about 80 μm, and a diameter of a tip end of each gold bump 34 is in a range of 40 μm to 50 μm. In this example, a diameter of a bottom portion of each hole H of the board 2 shown in FIGS. 4C and 4D is about 120 μm.

Also, as can be seen from FIG. 6B, a height of each protrusion P is smaller than a total height of each combination of the metal seat 32 and the gold bump 34.

Accordingly, a lens component 30 mainly made of glass is obtained. The gold bumps 34 of the lens component 30 are arranged so as to correspond to the respective metal pads MP of the board 2 shown in FIGS. 4C and 4D.

Although only one gold bump 34 is shown in FIG. 6B, actually plural (in this example, four) gold bumps 34 are arranged. The same is true for sectional views of lens components according to other exemplary embodiments and other modification examples.

Next, a method for mounting the lens component 30 shown in FIG. 6B on the board 2 shown in FIGS. 4C and 4D will be described.

Figure 7:
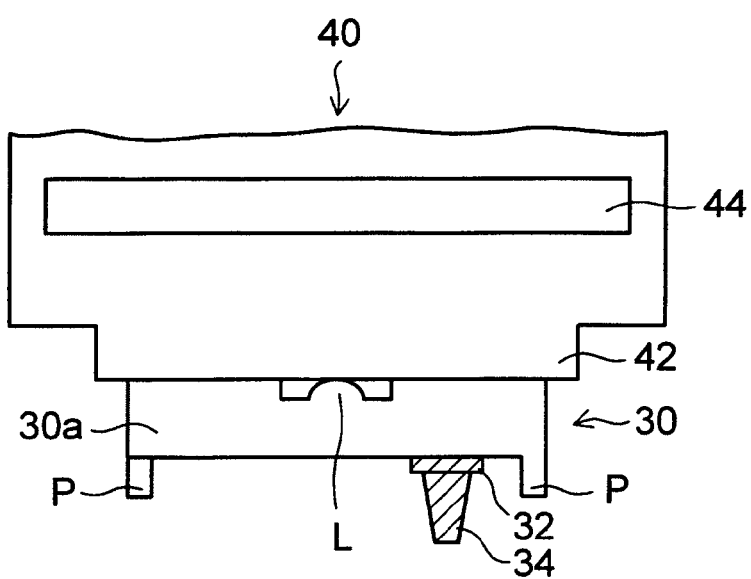
FIG. 7 is a fifth set of views (actually a single sectional view) illustrating the method for manufacturing the optical waveguide device according to the first exemplary embodiment.
Figure 7:
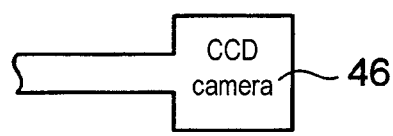
Figure 7:
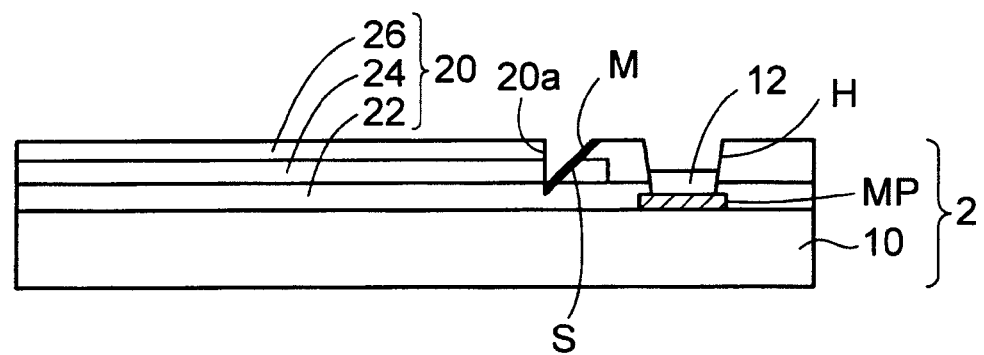

At first, as shown in FIG. 7, solder 12 is applied to the holes H of the board 2. For example, the solder 12 is applied by screen printing or using a dispenser. In the first exemplary embodiment, a metal joining material is used as a joining material. The solder 12 is an example of the metal joining material. Alternatively, solder balls may be provided in the respective holes H of the board 2.

In addition to solder, examples of the metal joining material include a conductive paste in which metal particles such as silver particles are dispersed in a resin.

In the first exemplary embodiment, solder having a relatively high melting temperature can be used because the glass lens component 30 having a high heat resistance is used.

Examples of a solder having a high melting temperature include a tin (Sn)/silver (Ag)/copper (Cu)-based lead (Pb)-free solder. A melting temperature of this Pb-free solder is about 270° C.

By virtue of the use of the solder 12 having a high melting temperature, the solder 12 is prevented from being molten again in a later step of mounting an optical device and/or a semiconductor chip by using solder that is lower in melting temperature than the solder 12.

Furthermore, as also shown in FIG. 7, a chip mounter 40 which is commonly used for flip-chip connection of a semiconductor chip is prepared. The chip mounter 40 is equipped with an absorption head 42 and a heater 44. The absorption head 42 suctions (absorbs) a work by vacuum suction. The heater 44 heats the absorption head 42.

A moving device (not shown) for moving the absorption head 42 vertically and horizontally is connected to the absorption head 42.

The absorption head 42 of the chip mounter 40 is caused to suction the lens component 30 shown in FIG. 6B. The lens component 30 is suctioned on the absorption head 42 with the gold bumps 34 facing downward. The heater 44 is turned on to heat the lens component 30 with the temperature of the absorption head 42 being set to be in a range of 300° C. to 350° C.

The chip mounter 40 is also equipped with a CCD camera 46. Alignment marks formed on the lens component 30 and the board 2 are captured by the CCD camera 46 and image-recognized. Thereby, the lens component 30 and the board 2 can be positioned with respect to each other.

In the above-described process, the convex lenses L of the lens component 30 may be used as alignment marks. As for the board 2, the patterns of the core layers 24 may be used as alignment marks. Alternatively, the lens component 30 and the board 2 may be further formed with dedicated alignment marks.

As described above, the chip mounter 40 is equipped with the high-accuracy positioning mechanism. Therefore, the lenses L of the lens component 30 and the respective optical path conversion mirrors M of the board 2 can be positioned with respect to each other with high accuracy.

Figure 8:
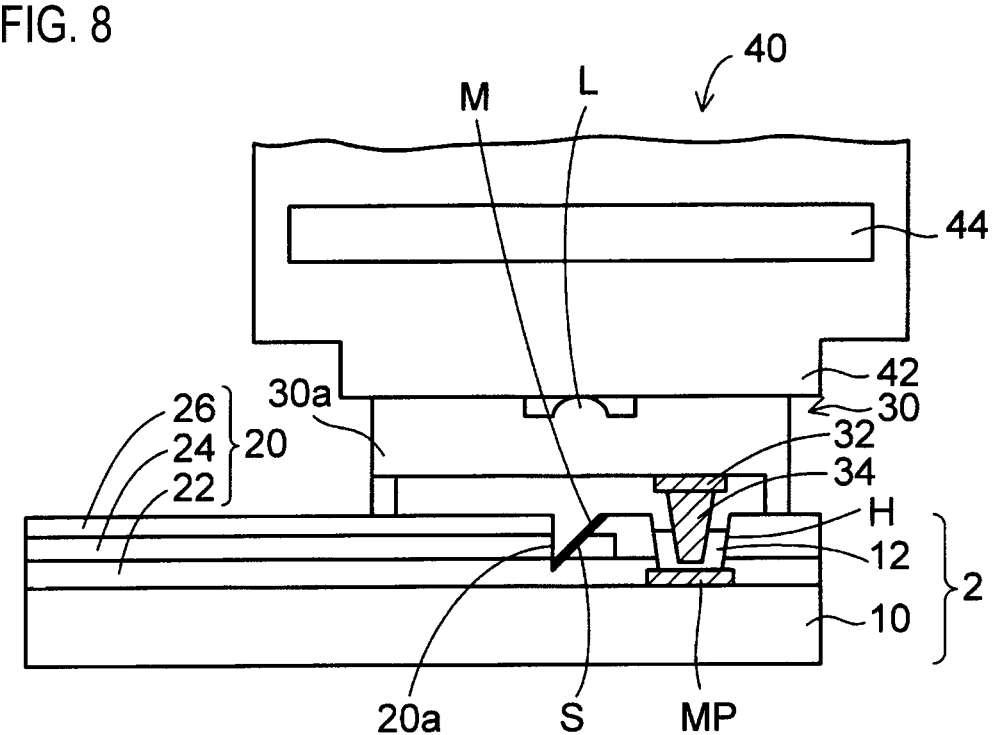
FIG. 8 is a sixth set of views (actually a single sectional view) illustrating the method for manufacturing the optical waveguide device according to the first exemplary embodiment.

Subsequently, as shown in FIG. 8, the gold bumps 34 of the lens component 30 that have been heated by the absorption head 42 are inserted into the solder 12 provided in the respective holes H of the board 2 so as to heat and reflow the solder 12. The heating to reflow the solder 12 may be performed from a stage (not shown) on which the board 2 is placed.

The minimum diameter of the holes H of the board 2 is larger than the diameter of the tip end of the gold bumps 34 of the lens component 30 as described above. Therefore, precise positioning in the horizontal direction can be made in the holes H in a state where the gold bumps 34 of the lens component 30 are inserted in the reflowed solder 12 provided in the respective holes H of the board 2.

As a result, the gold bumps 34 of the lens component 30 can be joined to the respective metal pads MP of the wiring board 10 by the solder 12 in a state where the lens component 30 is positioned with respect to the board 2 with high accuracy.

As described above, in the first exemplary embodiment, high-accuracy positioning and joining can be attained using the common solder application technique and the common chip mounter 40 that are used for flip-chip connection of a semiconductor chip.

Unlike the comparative examples which have been described with reference to FIGS. 1 and 2, there is no concern that applied adhesive occupies parts of the regions over the optical path conversion mirrors M of the respective optical waveguides 20. As a result, the process management is made easier, and the production efficiency can be enhanced. Furthermore, by virtue of the use of the common chip mounter, cost can be made lower than in a case of purchasing a custom-made chip mounter.

Figure 9A:
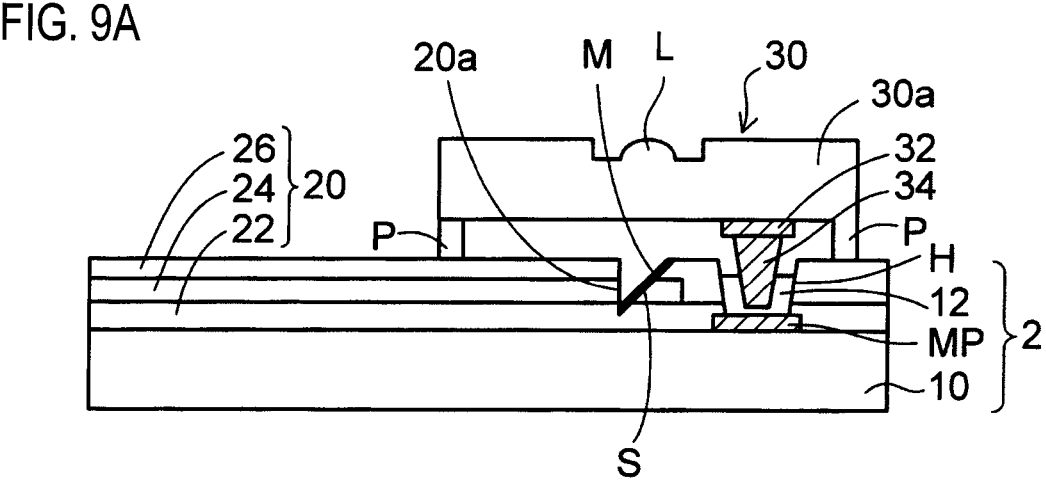
FIGS. 9A and 9B are a seventh set of views (a sectional view and a plan view) illustrating the method for manufacturing the optical waveguide device according to the first exemplary embodiment, FIG. 9A being the sectional view taken along a line IXA-IX-A shown in FIG. 9B.
Figure 9B:
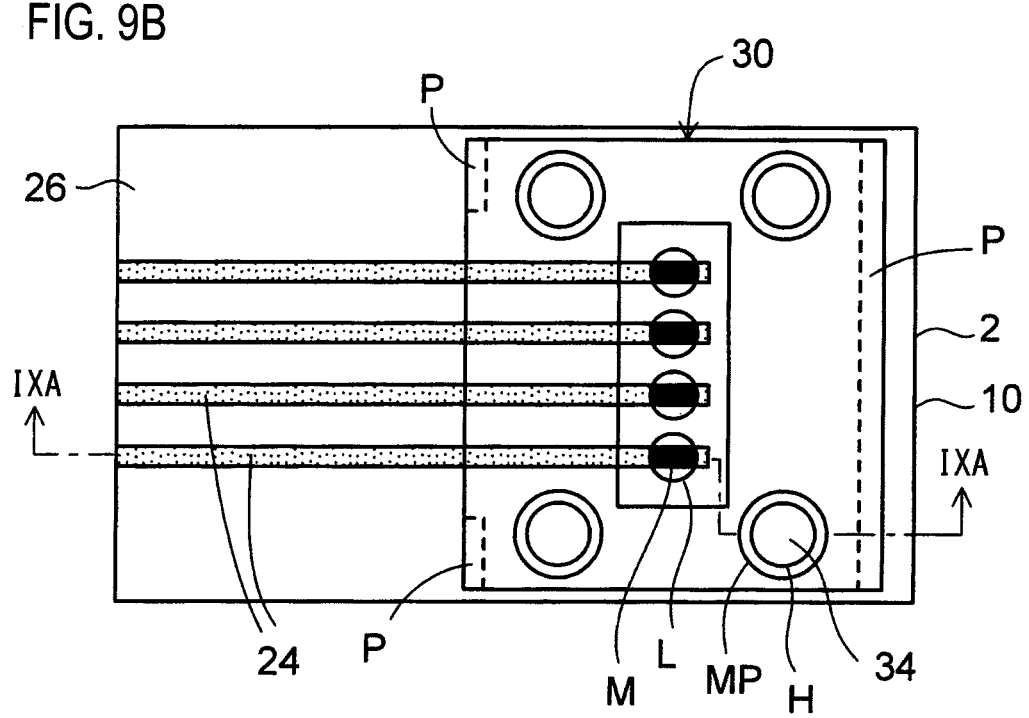

Then, as shown in FIGS. 9A and 9B, the absorption head 42 of the chip mounter 40 is removed from the lens component

30. FIG. 9A is a sectional view taken along a line IXA-IXA shown in FIG. 9B (which is a plan view).

As shown in FIG. 9B, the lens component 30 is mounted on the board 2 with the lenses L of the lens component 30 being positioned with respect to the respective optical path conversion mirrors M of the board 2.

According to the first exemplary embodiment, the lens component 30 can be mounted on the board 2 with high accuracy using the chip mounter 40 which is commonly used for flip-chip connection of a semiconductor chip.

As a result, the positional accuracy between each lens L of the lens component 30 and the optical path conversion mirror M of the corresponding optical waveguide 20 can be in a range of ±2 μm. As for a highest-level specification model, the positional accuracy is in a range of ±1 μm. Therefore, the high-performance optical waveguide device can be provided.

Figure 10A:
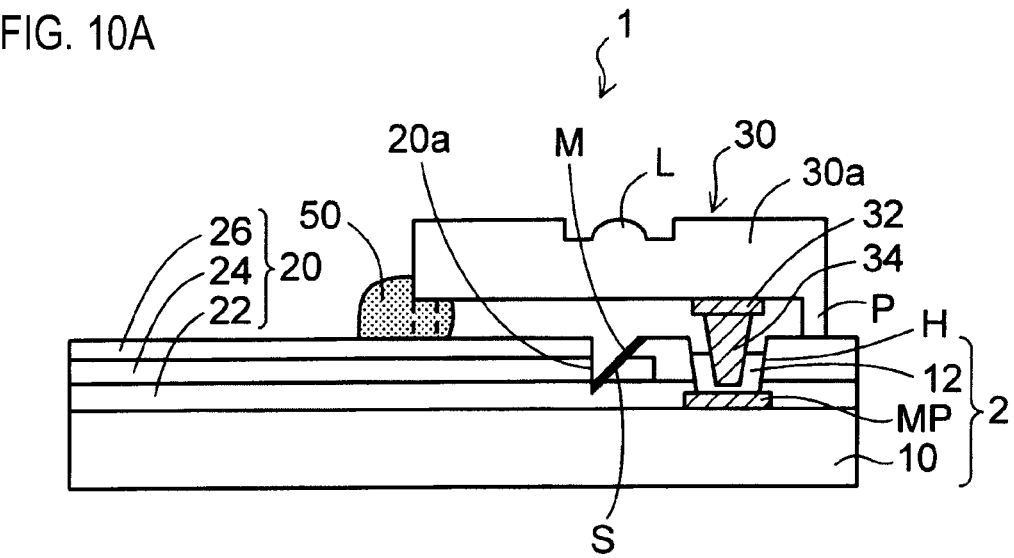
FIGS. 10A and 10B are a sectional view and a plan view showing the optical waveguide device according to the first exemplary embodiment, FIG. 10A being the sectional view taken along a line XA-XA shown in FIG. 10B.
Figure 10B:
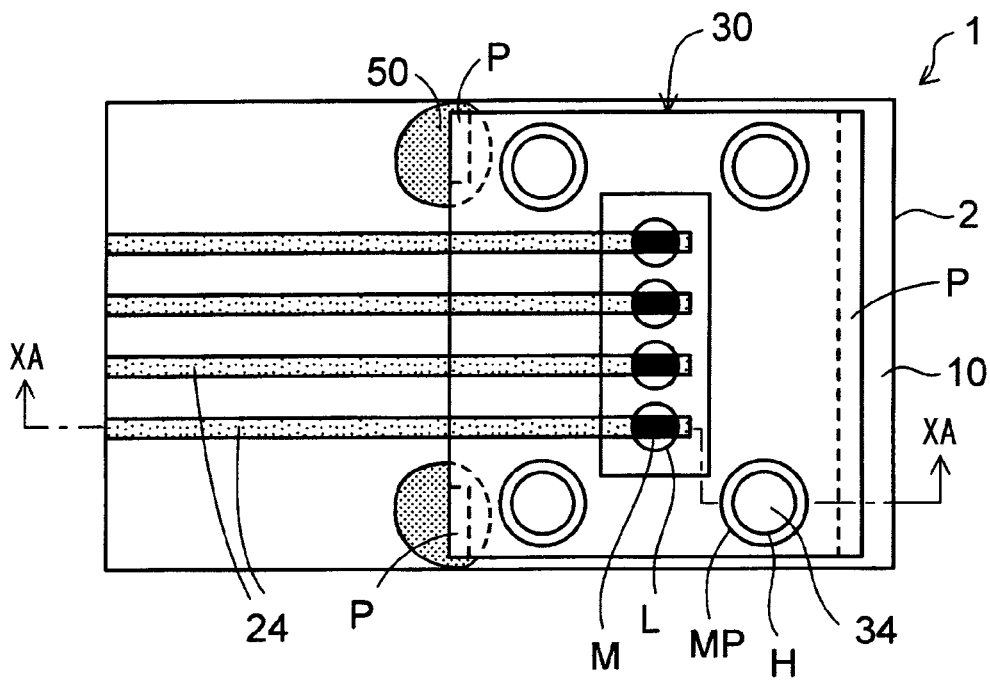

Subsequently, as shown in FIGS. 10A and 10B, the lens component 30 is fixed to the optical waveguides 20 by fixing resin portions 50. The fixing resin portions 50 are made of a thermosetting resin such as an epoxy resin. Where an epoxy resin is used, the fixing resin portions 50 are cured, for example, by heat treatment of about 140° C.

The fixing resin portions 50 are formed around outer circumferential portions of the lens component 30, for example, by a dispenser. More specifically, the fixing resin portions 50 surround each of the two protrusion portions P disposed at the left end portion (on the sheet of FIGS. 10A and 10B) of the lens component 30. A resin to become the fixing resin portions 50 is applied to regions around the outer circumferential portions of the lens component 30 after the lens component 30 is mounted on the board 2. Therefore, there is no concern that the resin flows into regions over the optical path conversion mirrors M, which are located under the lens component 30.

FIG. 10A is a sectional view taken along a line XA-XA shown in FIG. 10B which is a plan view. In the example shown in FIG. 10B, the fixing resin portions 50 are formed around two end portions of one side of the rectangular lens component 30. Alternatively, the fixing resin portions 50 may be formed around any outer circumferential portions of the lens component 30.

As a result, not only are the gold bumps 34 of the lens component 30 joined to the respective metal pads MP of the wiring board 10 by the solder 12, but also the lens component 30 is bonded to the optical waveguides 20 with the fixing resin portions 50. The lens component 30 is thereby fixed strongly to the board 2. An optical waveguide device 1 according to the first exemplary embodiment is thus completed.

As shown in FIGS. 10A and 10B, in the optical waveguide device 1 according to the first exemplary embodiment, the optical waveguides 20 are disposed on the wiring board 10. The optical waveguides 20 includes the first cladding layer 22, the core layers 24, and the second cladding layer 26 which are disposed in this order from the bottom.

Each groove 20*a* having the slant surface S is formed in the optical path conversion portion of the corresponding optical waveguide 20 which is provided at the one end portion of the core layer 24 of the corresponding optical waveguide 20. Each groove 20*a* is formed by dividing the corresponding second cladding layer 26 and the corresponding core layer 24. The light-reflective metal layer formed on the slant surface S of each groove 20*a* makes up the corresponding optical path conversion mirror M.

The holes H are formed in the first cladding layer 22 and the second cladding layer 26 and outside the optical waveguide formation region where the core layers 24 are provided. The metal pads MP are formed on the upper surface side of the wiring board 10. The metal pads MP are disposed in the bottom of the holes H, respectively.

Furthermore, the lens component 30 is mounted on the optical waveguides 20. The lens component 30 includes the lens main body 30*a*, the metal seats 32, and the gold bumps 34. The metal seats 32 are formed on the lower surface of the lens main body 30*a*. The gold bumps 34 are formed on the lower surfaces of the respective metal seats 32.

In this manner, the lens component 30 is provided with the gold bumps 34 which protrude downward from the lower surface of the lens main body 30*a*. The gold bumps 34 are an example of metal bumps. The gold bumps 34 may be made of any of various other metals such as copper.

The four convex lenses L are formed on the upper surface of the lens component 30. The lens component 30 also includes the protrusion portions P which protrude downward from the end portions on the lower surface of the lens main body 30*a*.

The gold bumps 34 of the lens component 30 are inserted in the respective holes H and joined to the respective metal pads MP of the wiring board 10 by the solder 12. The diameter of the tip end of the gold bumps 34 of the lens component 30 is smaller than the minimum diameter of the holes H.

The protrusion portions P of the lens component 30 abut against the upper surface of the second cladding layer 26. Thereby, the position of the lens component 30 in the vertical direction (the height of the lens component 30) is determined. The lens component 30 is bonded to the optical waveguides 20 by the fixing resin portions 50.

In the example of FIGS. 10A and 10B, the solder 12 is interposed between the gold bumps 34 of the lens component 30 and the metal pads MP of the wiring board 10. Alternatively, the gold bumps 34 may be in contact with the respective metal pads MP.

Referring to FIG. 10B, the lenses L of the lens component 30 are disposed so as to be positioned with respect to the respective optical path conversion mirrors M of the optical waveguides 20.

The optical waveguide device 1 according to the first exemplary embodiment is provided with the lens component 30 including the gold bumps 34 on lower surface thereof via the metal seats 32. The gold bumps 34 of the lens component 30 are joined and fixed, by the solder 12, to the metal pads MP in the holes H, respectively.

With the above-described structures, high-accuracy positioning and joining can be attained using the common solder applying technique and the common chip mounter which are used for flip-chip connection of a semiconductor chip.

Unlike the comparative example which have been described with reference to FIGS. 1 and 2, there is no concern that applied adhesive occupies parts of the regions over the optical path conversion mirrors M of the respective optical waveguides 20. As a result, the process management is made easier. Furthermore, by virtue of the use of the common chip mounter, the cost reduction can be attained.

Not only are the gold bumps 34 of the lens component 30 joined to the respective metal pads MP of the wiring board 10 by the solder 12, but also the lens component 30 is bonded strongly to the optical waveguides 20 by the fixing resin portions 50.

In the optical waveguide device 1 according to the first exemplary embodiment, optical path conversion mirrors (not shown) similar to the above-described optical path conversion mirrors M are formed at the other end portions (opposite end portions) of the respective optical waveguides 20. Optical devices are mounted over the respective optical waveguides 20 so as to be optically coupled to the respective optical path conversion mirrors provided at the other end portions of the optical waveguides 20. The optical devices may be light-emitting devices or light-receiving devices.

The lens component 30 is fitted with an optical connector (not shown) for input/output of optical signals. Light beams are condensed and collimated by the lens components 30. Thereby, the light utilization efficiency can be enhanced. Also, transmission of optical signals can be made more stable.

Even if the optical connector is curved to exert stress on the lens component 30, the lens component 30 is neither deviated nor detached because the lens component 30 is strongly fixed to the optical waveguides 20 by the fixing resin portions 50.

Alternatively, the lens component 30 may be mounted with optical devices that are optically coupled to the respective optical path conversion mirrors M.

Second Exemplary Embodiment

FIGS. 11A to 13 illustrate a method for manufacturing an optical waveguide device according to a second exemplary embodiment. FIG. 14 shows the optical waveguide device according to the second exemplary embodiment.

The second exemplary embodiment is different from the first exemplary embodiment in that the lens component is made of a resin. In the second exemplary embodiment, steps and elements which are the same as those in the first exemplary embodiment will be given the same reference symbols, and redundant description thereon will be omitted.

Figure 11A:
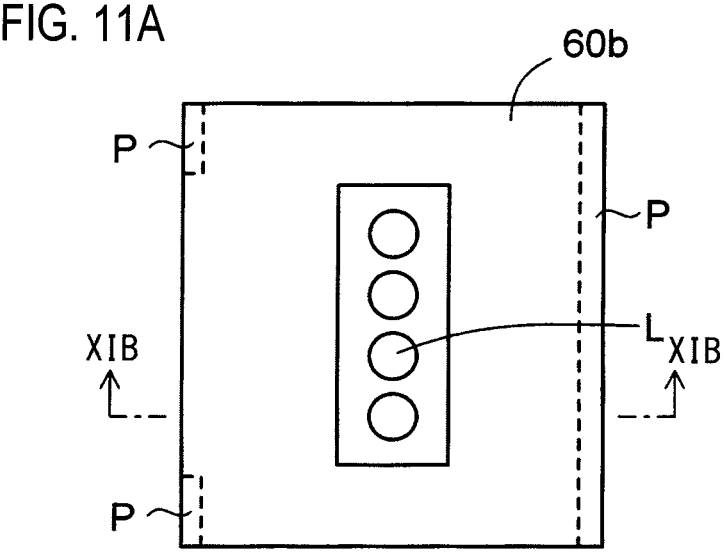
FIGS. 11A and 11B are a first set of views (a sectional view and a plan view) illustrating a method for manufacturing an optical waveguide device according to a second exemplary embodiment, FIG. 11B being a sectional view taken along a line XIB-XIB shown in FIG. 11A.
Figure 11B:
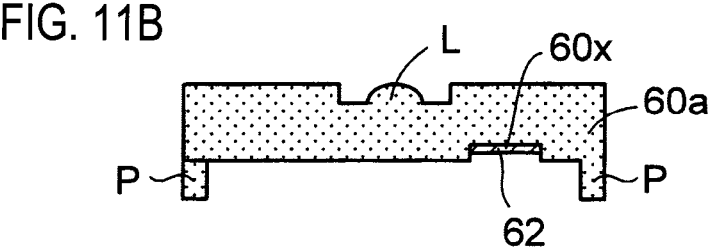

In the method for manufacturing the optical waveguide device according to the second exemplary embodiment, at first, as shown in FIGS. 11A and 11B, a lens main body 60a is prepared which is made of a resin. FIG. 11B is a sectional view taken along a line XIB-XIB shown in FIG. 11A (which is a plan view).

As in the first exemplary embodiment, plural (in this example, four) convex lenses L are arranged on an upper surface of the lens main body 60a. That is, the lens main body 60a has a lens function. Protrusion portions P are formed at end portions on a lower surface of the lens main body 60a.

Figure 11C:
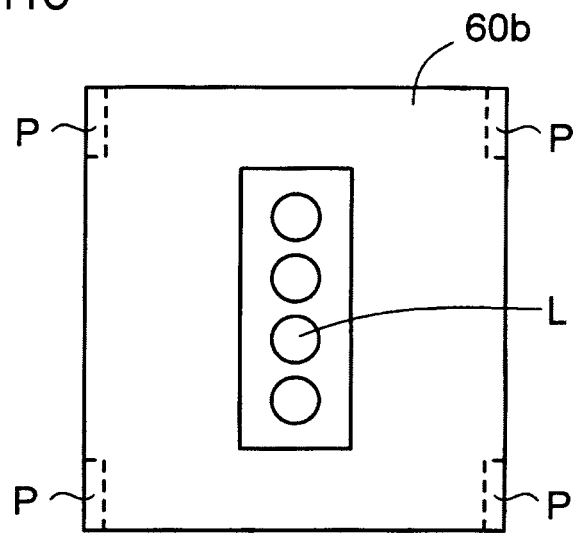
FIG. 11C is a plan view showing a modification example of a lens component.

In FIG. 11A, the protrusion portion P provided on one end portion (right end portion on the sheet of the figure) of the lens main body 60a is an integrated protrusion portion extending entirely between end portions of the lens main body 60a in the upper and lower directions on the sheet of the figure. Alternatively, separate protrusion portions P may be provided on the one end portion of the lens main body 60a as shown in FIG. 11C.

The lower surface of the lens main body 60a is formed with recesses 60x. Aluminum (Al) layers 62a are formed on a bottom of the recesses 60x, respectively.

The lens main body 60a having the aluminum layers 62a is formed by injection molding. Molten resin is injected into a die in which aluminum plate pieces are placed. Then, the resin is solidified by cooling. Thereby, the lens main body 60a having the aluminum layers 62a is obtained.

Figure 12A:
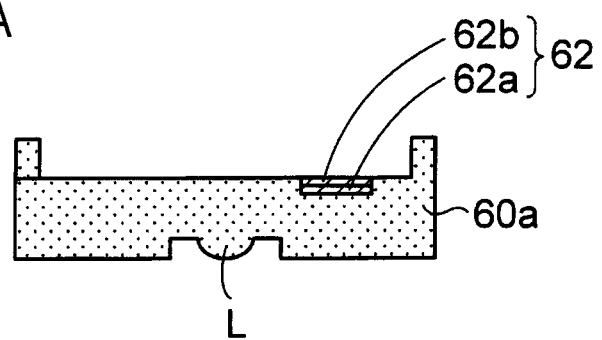
FIGS. 12A and 12B are a second set of views (sectional views) illustrating the method for manufacturing the optical waveguide device according to the second exemplary embodiment.

Next, as shown in FIG. 12A, copper layers 62b are formed, by electroless plating, on the respective aluminum layers 62a on the rear surface of the lens main body 60a. The aluminum layers 62a and the copper layers 62b constitute respective metal seats 62.

Figure 12B:
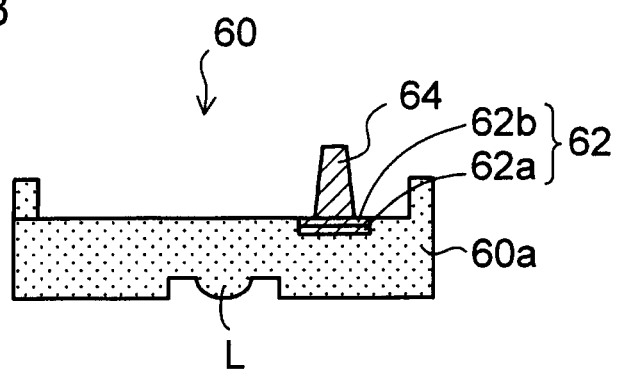

Subsequently, as shown in FIG. 12B, gold (Au) bumps 64 (gold studs) are formed on the respective metal seats 62 by a wire bonding method. A resin lens component 60 is thus obtained.

Figure 13:
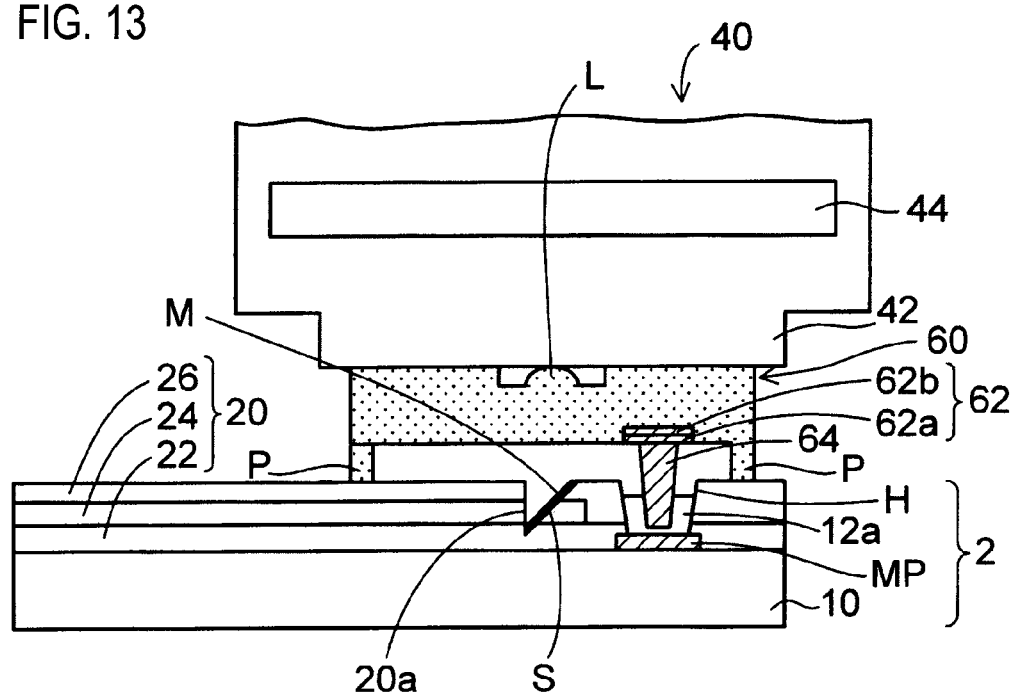
FIG. 13 is a third set of views (actually a single sectional view) illustrating the method for manufacturing the optical waveguide device according to the second exemplary embodiment.
Figure 14:
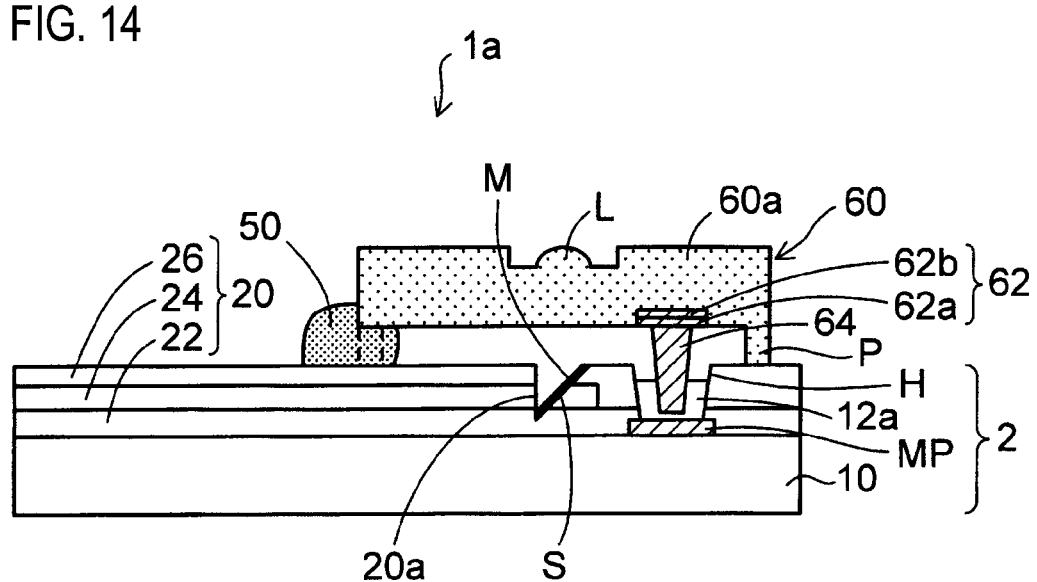
FIG. 14 is a sectional view showing the optical waveguide device according to the second exemplary embodiment.

Then, as shown in FIG. 13, in the same manner as in the steps of the first exemplary embodiment shown in FIGS. 7 and 8, the lens component 60 shown in FIG. 12B is absorbed onto an absorption head 42 of a chip mounter 40, and positioning is performed. The resin lens component 60 has a characteristic that the resin lens component 60 is lower in heatproof temperature than the glass lens component 30 employed in the first exemplary embodiment.

Therefore, in the second exemplary embodiment, the heating temperature of the absorption head 42 is set to be lower than that in the first exemplary embodiment. For example, where the lens component 60 is made of an epoxy resin whose heatproof temperature is higher than 200° C., the lens component 60 is heated by raising the temperature of the absorption head 42 to be in a range of 140° C. to 200° C. by a heater 44.

In this connection, in the second exemplary embodiment, a low-melting-temperature solder 12a is used. A melting temperature of the low-melting-temperature solder 12a is, for example, in a range of 140° C. to 200° C. Examples of the low-melting-temperature solder include a tin (Sn)/bismuth (Bi)-based lead (Pb)-free solder.

A lead-containing solder may be used so long as a melting temperature of the solder is in a range of 140° C. to 200° C. Such a low-melting-temperature solder 12a is applied to the holes H of the board 2.

In this manner, the gold bumps 64 of the lens component 60 that are absorbed onto the absorption head 42 are inserted into the solder 12a which is disposed in the respective holes H of the board 2. Then, precise positioning is performed between the lens component 60 and the optical waveguides 20 while the heated lens component 60 heats and reflows the solder 12.

As described above, where the resin lens component 60 is used, use of the low-melting-temperature solder 12a ensures heat-resisting properties of the lens component 60. Thereby, deformation of the lens component 60 can be prevented.

Then, as shown in FIG. 14, the absorption head 42 of the chip mounter 40 is removed from the lens component 60. Furthermore, as in the step shown in FIGS. 10A and 10B (first exemplary embodiment), the lens component 60 is bonded to the optical waveguides 20 by fixing resin portions 50. An optical waveguide device 1a according to the second exemplary embodiment is thus completed.

In the optical waveguide device 1a according to the second exemplary embodiment, the resin lens component 60 is used, and the gold bumps 64 of the lens component 60 are joined to the respective metal pads MP of the wiring board 10 by the low-melting-temperature solder 12a. The other elements are substantially the same as those of the optical waveguide device 1 according to the first exemplary embodiment.

The optical waveguide device 1a according to the second exemplary embodiment provides the same advantages as the optical waveguide device 1 according to the first exemplary embodiment provides.

The second exemplary embodiment employs the low-melting-temperature solder 12a whose melting temperature is in the range of 140° C. to 200° C. In a later step, an optical device and/or a semiconductor chip may be mounted by reflow-soldering at a temperature that is higher than 200° C.

In such an event, the low-melting-temperature solder 12a to which the gold bumps 64 of the lens component 60 are joined are molten again. However, since the lens component 60 is strongly bonded to the optical waveguides 20 by the fixing resin portions 50, the lens component 60 does not deviate and hence does not cause any related problems.

Third Exemplary Embodiment

FIGS. 15A to 17 illustrate a method for manufacturing an optical waveguide device according to a third exemplary embodiment. FIGS. 18a and 18B show the optical waveguide device according to the third exemplary embodiment.

In the third exemplary embodiment, bump portions that correspond to the metal seats and the gold bumps of the lens component used in the first exemplary embodiment are made of the same material as the lens main body. Furthermore, a resin adhesive is used as the joining material.

Figure 15A:
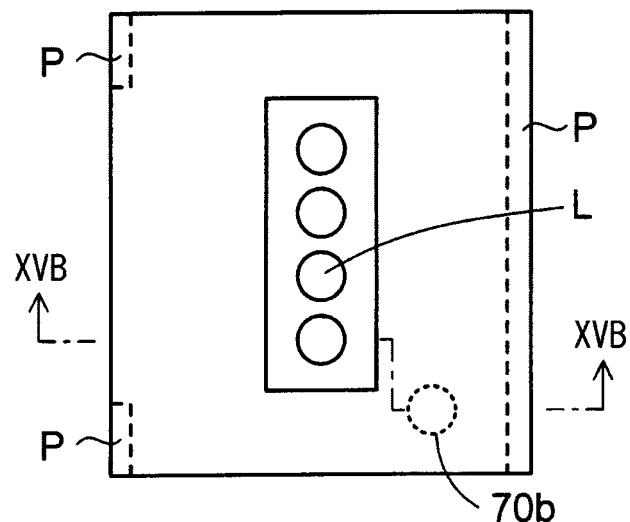
FIGS. 15A and 15B are a first set of views (a sectional view and a plan view) illustrating a method for manufacturing an optical waveguide device according to a third exemplary embodiment, FIG. 15B being the sectional view taken along a line XVB-XVB shown in FIG. 15A.
Figure 15B:
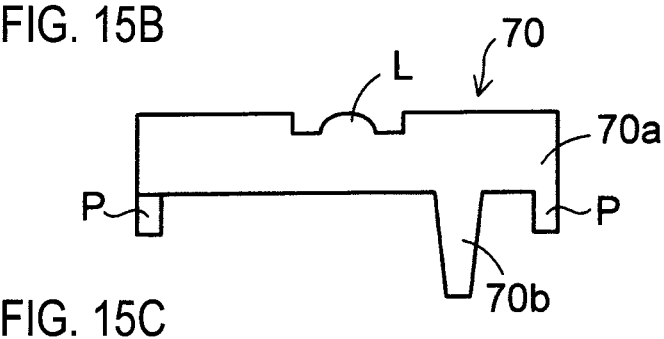

As shown in FIGS. 15A and 15B, a lens component 70 used in the third exemplary embodiment is formed by injection molding so that a lens main body 70a, bumps 70b and protrusion portions P are made of glass and integrated. FIG. 15B is a sectional view taken along a line XVB-XVB shown in FIG. 15A (which is a plan view).

Molten glass is injected into a die that conforms to an external shape of the intended lens component 70 shown in FIGS. 15A and 15B and solidified by cooling. Thereby, the lens main body 70a, the bumps 70b connected to the lens main body 70a, and the protrusion portions P connected to the lens main body 70a are integrally formed and made of the same material. The other elements of the lens component 70 are the same as those of the lens component 30 used in the first exemplary embodiment.

Alternatively, a technique of cutting a glass material may be used. When lenses L are formed by cutting a glass material, the lens main body 70a, the bumps 70b, and the protrusion portions P may also be formed integrally at the same time.

Figure 15C:
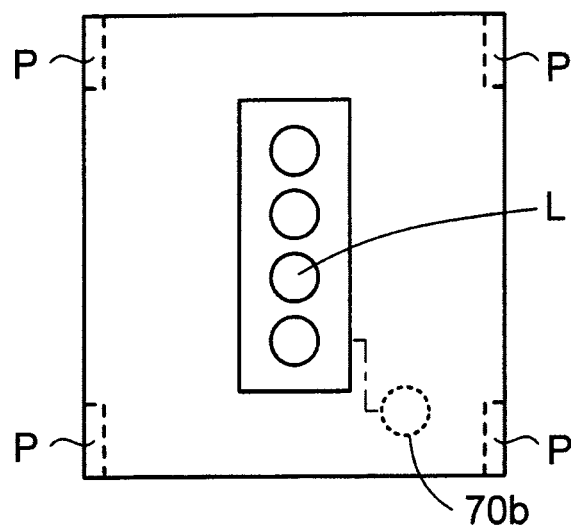
FIG. 15C is a plan view showing a modification example of a lens component.

In FIG. 15A, the protrusion portion P provided on one end portion (right end portion on the sheet of the figure) of the lens main body 70a is an integrated protrusion portion extending entirely between end portions of the lens main body 70a in the upper and lower directions on the sheet of the figure. Alternatively, separate protrusion portions P may be provided on the one end portion of the lens main body 70a as shown in FIG. 15C.

Figure 16:
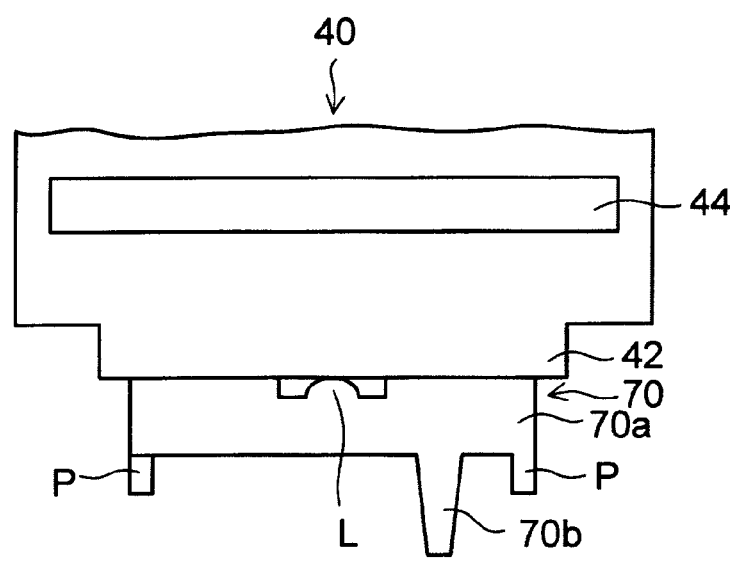
FIG. 16 is a second set of views (actually a single sectional view) illustrating the method for manufacturing the optical waveguide device according to the third exemplary embodiment.
Figure 16:
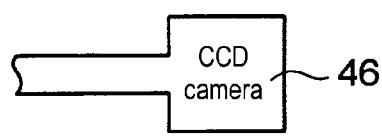
Figure 16:
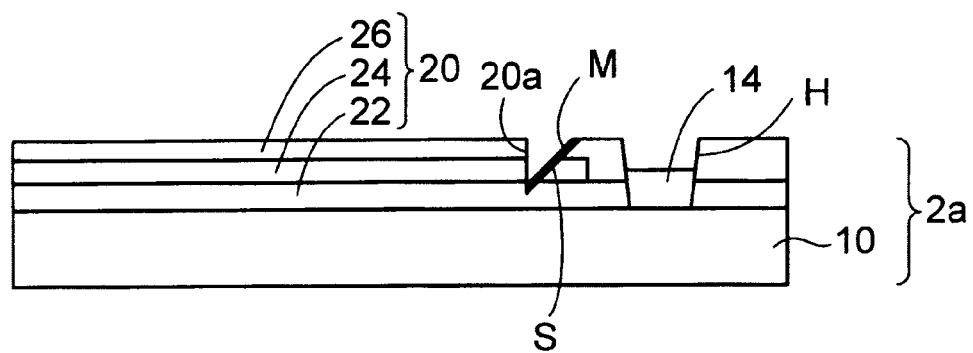

Then, as shown in FIG. 16, an optical waveguide equipped board 2a is prepared. In the following description, the optical waveguide equipped board 2a may be simply referred to as a "board 2a." In the board 2a used in the third exemplary embodiment, portions of an insulating layer of a wiring board 10 are exposed in bottom of respective holes H. The insulating layer of the wiring board 10 is made of an insulating resin. The insulating layer of the wiring board 10 may be a core substrate or an interlayer insulating layer of a multilayer wiring layer.

Subsequently, a resin adhesive 14 is applied to the respective holes H of the board 2a. The resin adhesive 14 is a thermosetting resin such as an epoxy resin. In the third exemplary embodiment, the resin adhesive 14 is used as the joining material.

The resin adhesive 14 can be applied to the respective holes H of the board 2a in such a manner that an amount of the resin adhesive 14 can be controlled little by little. Therefore, unlike the comparative examples which have been described with reference to FIGS. 1 and 2, there is no concern that applied resin adhesive 14 occupies parts of the regions over the optical path conversion mirrors M of the optical waveguides 20.

Next, as in the step shown in FIG. 7 (first exemplary embodiment), the lens component 70 shown in FIGS. 15A and 15B is absorbed onto an absorption head 42 of a chip mounter 40 and heated.

Subsequently, as in the step shown in FIG. 7 (first exemplary embodiment), alignment marks are captured by a CCD camera 46 and image-recognized. Thereby, the lens component 70 is positioned with respect to the respective optical path conversion mirrors M of the board 2a.

Figure 17:
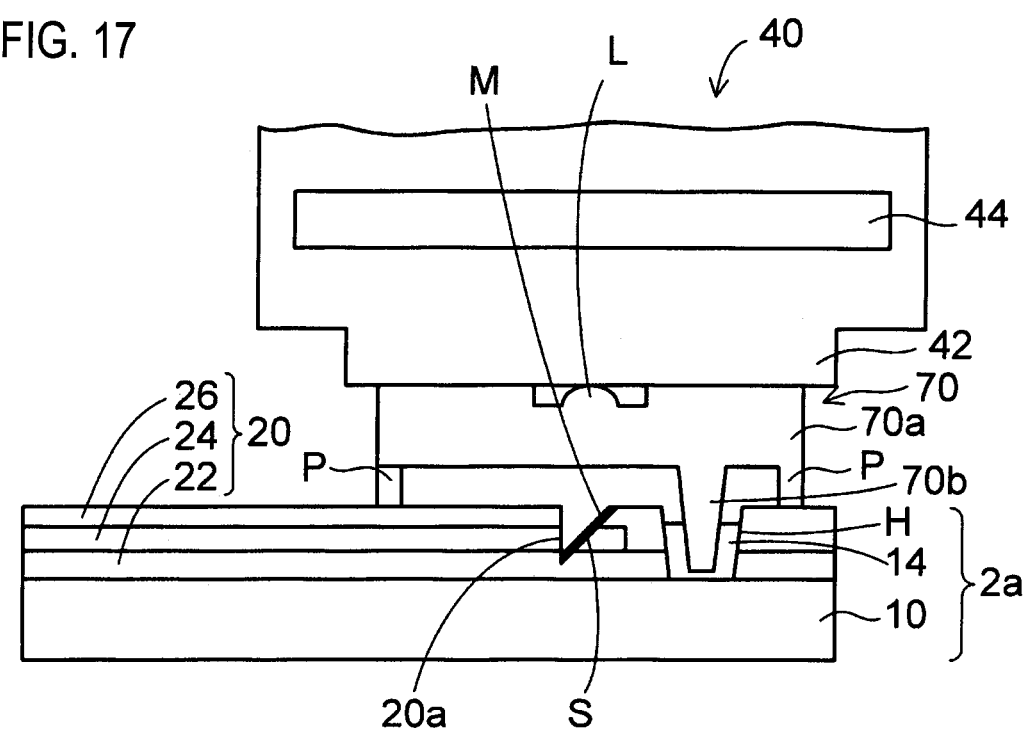
FIG. 17 is a third set of views (actually a single sectional view) illustrating the method for manufacturing the optical waveguide device according to the third exemplary embodiment.
Figure 18A:
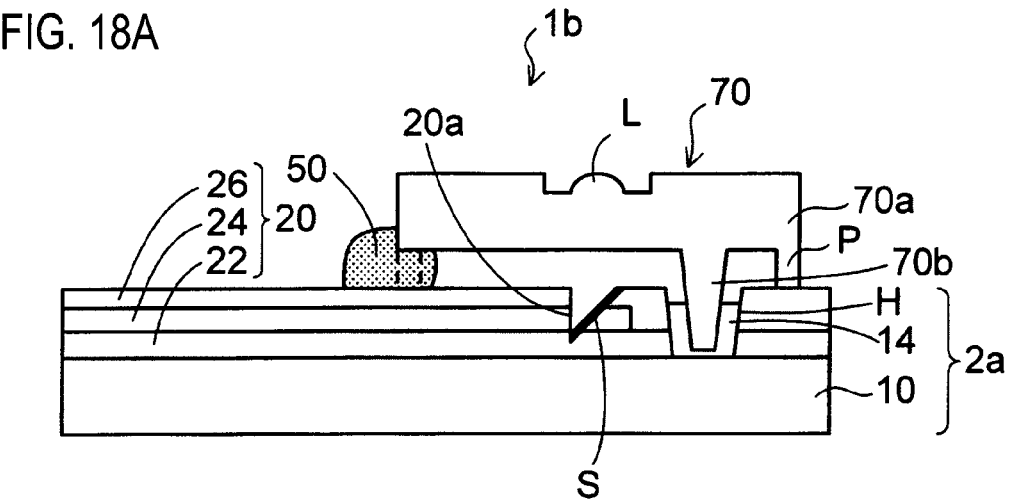
FIGS. 18A and 18B are a sectional view and a plan view showing the optical waveguide device according to the third exemplary embodiment, FIG. 18A being the sectional view take along a line XVIIIA-XVIIIA shown in FIG. 18B.
Figure 18B:
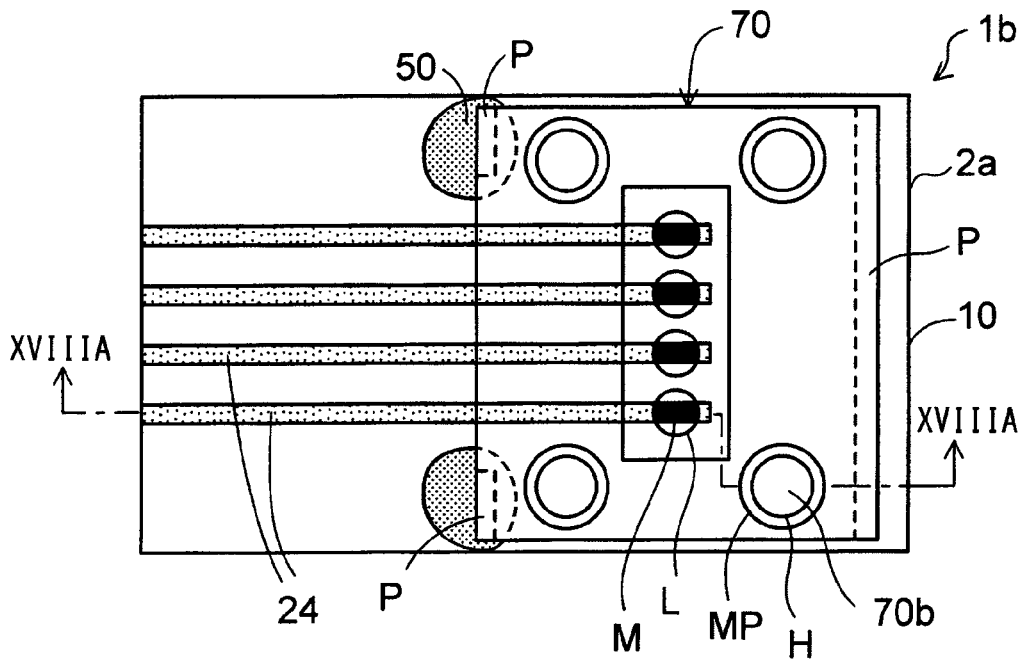

Furthermore, as shown in FIG. 17, the bumps 70b of the lens component 70 are inserted into the resin adhesive 14 disposed in the respective holes H of the board 2a. The resin adhesive 14 is cured by heating while precise positioning is performed. The heating to cure the resin adhesive 14 may be performed from a stage (not shown) on which the board 2a is placed.

In the third exemplary embodiment, the bumps 70b of the lens component 70 are joined to the board 2a in the holes H of the board 2a by the resin adhesive 14. Therefore, an insulating layer having a strong adhesion property with respect to the resin adhesive member 14 may be formed at the bottoms of the respective holes H.

However, if necessary, as in the first exemplary embodiment, it is possible to dispose metal pads at the bottoms of the respective holes H and to bond the bumps 70b of the lens component 70 to the respective metal pads by the resin adhesive 14.

Then, as shown in FIGS. 18A and 18B, the absorption head 42 of the chip mounter 40 is removed from the lens component 70. Subsequently, as in the step shown in FIGS. 10A and 10B (first exemplary embodiment), the lens component 70 is bonded to the optical waveguides 20 by fixing resin portions 50.

An optical waveguide device 1b according to the third exemplary embodiment is thus completed. FIG. 18A is a sectional view take along a line XVIIIA-XVIIIA shown in FIG. 18B.

Figure 19:
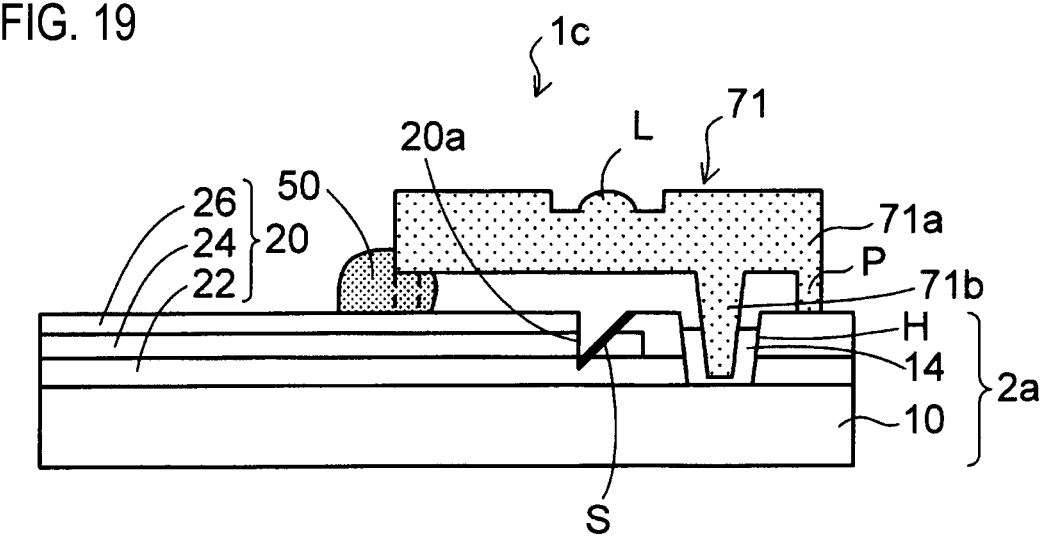
FIG. 19 is a sectional view showing an optical waveguide device according to a modification of the third exemplary embodiment.

FIG. 19 shows a modification example which employs, instead of the integral glass lens component 70, a lens component 71 that is formed by injection molding so that a lens main body 71a, bumps 71b and protrusion portions P are integrally formed and made of a resin.

In this modification example, molten resin is injected into a die that conforms to an external shape of the intended lens component 71 shown in FIG. 19, and the resin is solidified by cooling. Thereby, the integral lens component 71 having the lens main body 71a, the bumps 71b connected to the lens main body 71a and the protrusion portions P connected to the lens main body 71a is formed using the same material. The other elements of the lens component 71 are the same as those of the lens component 30 used in the first exemplary embodiment.

Alternatively, a technique of cutting a resin member may be used. Where lenses L are formed by cutting a resin material, a lens main body 71a, bumps 71b and protrusion portions P may also be formed integrally at the same time.

Subsequently, as in the step shown in FIG. 17 (third exemplary embodiment), the bumps 71b of the lens component 71 are bonded to the board 2a in the respective holes H of the board 2a by the resin adhesive 14 while the lens component 71 is positioned with respect to the optical path conversion mirrors M of the respective optical waveguides 20.

Then, as in the step shown in FIG. 18, the lens component 71 is bonded to the optical waveguides 20 by fixing resin portions 50. An optical waveguide device 1c according to the modification example of the third exemplary embodiment is thus completed.

The optical waveguide device 1b according to the third exemplary embodiment and the optical waveguide device 1c according to the modification example provide the same advantages as the optical waveguide device 1 according to the first exemplary embodiment provides.

The lens components 70, 71 used in the third exemplary embodiment and the modification example thereof, the bumps 70b, 71b are made of the same material as the lens main body 70a, 70b. Therefore, it is not necessary to form metal seats and metal bumps on the lens main body 70a, 71a.

As a result, the manufacturing process can be simplified, and the manufacturing cost can be reduced.

CLAUSES

This disclosure further encompasses various exemplary embodiments, for example, described below.

1. A method for manufacturing an optical waveguide device, comprising:

forming, on a wiring board, an optical waveguide including a first cladding layer, a core layer, and a second cladding layer;

forming a hole in the first cladding layer and the second cladding layer and outside an optical waveguide formation region where the optical waveguide is formed;

forming an optical path conversion mirror in the optical waveguide;

preparing a lens component comprising a lens main body having a lens function, a bump, and protrusion portions that protrude from the lens main body;

fixing the bump of the lens component to a structure including the wiring board and the optical waveguide, in the hole by a joining material so that the lens component is optically coupled to the optical path conversion mirror, wherein a diameter of a tip end of the bump of the lens component is smaller than a minimum diameter of the hole.

2. The method of the clause 1, wherein the forming the optical waveguide comprises forming a metal pad on the wiring board, the hole is formed so that the metal pad is disposed at a bottom of the hole, the bump of the lens component is a metal bump, the joining material is a metal joining material, and the metal bump of the lens component is joined to the metal pad by the metal joining material.

3. The method of the clause 2, wherein in the forming the optical waveguide, the wiring board has an insulating layer a portion of which is exposed at the bottom of the hole, the bump of the lens component is made of the same material as the lens main body, the joining material is a resin adhesive, and the bump of the lens component is bonded to the portion, exposed at the bottom of the hole, of the insulating layer by the resin adhesive.

4. The method of the clause 2, further comprising:

after the fixing the bump, forming, around an outer circumferential portion of the lens component, a fixing resin portion that fixes the lens component to the optical waveguide.

What is claimed is:

1. An optical waveguide device comprising:

a wiring board;

an optical waveguide disposed on the wiring board and including a first cladding layer, a core layer, and a second cladding layer;

an optical path conversion mirror formed in the optical waveguide;

a hole formed in the first cladding layer and the second cladding layer and outside an optical waveguide formation region where the optical waveguide is formed; and a lens component that is optically coupled to the optical path conversion mirror, wherein the lens component comprises a lens main body having a lens function, a bump that is fixed to a structure including the wiring board and the optical waveguide, in the hole by a joining material, and protrusion portions that protrude from the lens main body, and a diameter of a tip end of the bump of the lens component is smaller than a minimum diameter of the hole.

2. The device of claim 1, wherein the wiring board comprises a metal pad that is formed at a bottom of the hole, the bump of the lens component is a metal bump, the joining material is a metal joining material, and the metal bump of the lens component is joined to the metal pad by the metal joining material.

3. The device of claim 2, wherein the metal joining material is solder.

4. The device of claim 2, wherein the wiring board comprises a wiring layer that is disposed at the same height as the metal pad and that is not electrically connected to the metal pad.

5. The device of claim 1, wherein the wiring board comprises an insulating layer a portion of which is exposed at a bottom of the hole, the bump of the lens component is made of the same material as the lens main body, the joining material is a resin adhesive, and the bump of the lens component is bonded to the portion, exposed at the bottom of the hole, of the insulating layer by the resin adhesive.

6. The device of claim 1, further comprising:

a fixing resin portion that is formed around an outer circumferential portion of the lens component and that fixes the lens component to the optical waveguide.

7. The device of claim 1, further comprising:

a fixing resin portion that surrounds at least two of the protrusion portions of the lens component and that fixes the lens component to the optical waveguide.

8. The device of claim 1, wherein the lens component is made of glass.

9. The device of claim 1, wherein the lens component is made of resin.

10. The device of claim 1, wherein the lens main body is made of glass.

11. The device of claim 1, wherein the lens main body is made of resin.

12. The device of claim 1, wherein the second cladding layer is formed on the first cladding layer in a region outside the optical waveguide formation region, and the protrusion portions abut against the second cladding layer.

13. The device of claim 1, wherein the bump of the lens component is a metal bump, and the metal bump is fixed to the lens main body via a metal seat.

14. The device of claim 1, wherein the lens main body comprises a convex lens that provides the lens function.

* * * * *